(12) United States Patent
Lam (10) Patent No.: US 9,108,723 B2
(45) Date of Patent: Aug. 18, 2015

(54) FLAP PANEL SHUTTLE SYSTEM AND METHOD THEREFOR (76) Inventors: Lawrence Lam, Los Altos Hills, CA (US); Michael Lam, legal representative, Los Altos Hills, CA (US)

( * ) Notice: Subject to any disclaimer, the term of this patent is extended or adjusted under 35 U.S.C. 154(b) by 36 days.

(21) Appl. No.: 13/702,521

(22) PCT Filed: Jun. 7, 2011
(Under 37 CFR 1.47)

(86) PCT No.: PCT/US2011/039412
§ 371 (c)(1),
(2), (4) Date: Jul. 16, 2013

(87) PCT Pub. No.: WO2011/156347
PCT Pub. Date: Dec. 15, 2011

(65) Prior Publication Data
US 2013/0334363 A1 Dec. 19, 2013

Related U.S. Application Data (60) Provisional application No. 61/352,152, filed on Jun. 7, 2010.

(51) Int. Cl.
*B64C 3/28* (2006.01)
*B64C 13/28* (2006.01)
*B64C 9/02* (2006.01)
*B64C 9/16* (2006.01)
*B64C 9/14* (2006.01)

(52) U.S. Cl.
CPC . *B64C 13/28* (2013.01); *B64C 9/02* (2013.01); *B64C 9/14* (2013.01); *B64C 9/16* (2013.01)

(58) Field of Classification Search
CPC .............. B64C 9/08; B64C 9/06; B64C 3/28; B64C 9/02; B64C 9/16; B64C 9/14
USPC .......................................................... 244/99.3
See application file for complete search history.

(56) References Cited

U.S. PATENT DOCUMENTS

| 4,180,222 | A | * | 12/1979 | Thornburg | 244/225 |
| 6,079,672 | A | * | 6/2000 | Lam et al. | 244/217 |
| 6,554,229 | B1 | * | 4/2003 | Lam et al. | 244/217 |
| 2009/0302174 | A1 | * | 12/2009 | Ausman et al. | 244/76 R |

OTHER PUBLICATIONS

PCT Search Report and Written Opinion under date of mailing of Feb. 24, 2012 in connection with PCT/US2011/039412.

* cited by examiner

*Primary Examiner* — Justin Benedik
(74) *Attorney, Agent, or Firm* — Quarles & Brady LLP (57) ABSTRACT An aircraft control system is presented. The system includes a wing including a flap track, and a shuttle connected to the flap track and configured to slide along a length of the flap track. The system includes a flap panel pivotally attached to the shuttle at a flap pivot. The flap panel is configured to rotate about the flap pivot. When the shuttle is deployed along a length of the flap track, the shuttle is configured to prevent rotation of the flap panel about the flap pivot, and when the shuttle is withdrawn into a stowed position, the shuttle is configured to allow the flap panel to rotate about the flap pivot.

9 Claims, 10 Drawing Sheets

Fig. 8

FLAP PANEL SHUTTLE SYSTEM AND METHOD THEREFOR

CROSS-REFERENCE TO RELATED APPLICATIONS

This application represents the national stage entry of PCT International Application No. PCT/US2011/039412 filed Jun. 7, 2011, which claims the benefit of U.S. Provisional Patent Application Ser. No. 61/352,152 filed on Jun. 7, 2010, both of which are incorporated herein by reference in their entirety for all purposes.

FIELD

Various implementations of the present invention, and combinations thereof, are related to shuttle systems and, more particularly, to a locking shuttle system for an airplane flap panel.

BACKGROUND

The flight of an aircraft can be modified using flight control surfaces that are connected to the aircraft's wing. The control surfaces include ailerons, flaps, and spoilers that can be used to roll the aircraft, provide additional lift, or control an airspeed of the aircraft.

Flaps are surfaces that are mounted at the trailing edge of each wing. During high-speed flight, the flaps are retracted underneath the wing and do not usually contribute significantly to the aerodynamic characteristics of the wing. During low speed flight, however, the flaps can be deployed from the trailing edge of the wing to modify the shape of the wing to increase lift.

Generally, the flaps increase the wing's camber—the degree of asymmetry between the top surface and bottom surface of the wing. Although deployed flaps create drag, the flaps can be used during take-off or landing to increase lift and to allow for flight at slow speed. In some aircraft, the flaps are deployed on a rail or track system, also referred to as a flap track that allows the flaps to extend away from the trailing edge of the wing, thereby increasing both the wing's camber and surface area. In such an implementation, the flaps can be fixed to a shuttle that runs along the rail or track system, changing a position of the flaps. Because the flaps are fixed to the shuttle, the flaps cannot be articulated and cannot be used as control surfaces to roll or bank the aircraft. Instead, those actions are implemented using ailerons.

An aileron is a hinged panel on the trailing edge of the wing, usually located at the outboard portion of the wing. The aileron can either be raised or lowered to decrease or increase lift on the wing. When deflected downwardly, the aileron increases the lift of the wing, to roll or bank the airplane into a turn. At the same time, the aileron on the other wing is deflected upwardly, to decrease the lift on that wing to augment the rolling motion.

One of the most objectionable features of conventional aileron applications is a phenomenon referred to as "adverse yaw." When a turn is initiated with conventional ailerons, the nose of the airplane turns first in a direction opposite to that of the intended turn. This is usually compensated for by using rudder deflection to coordinate the turn. The adverse yawing motion is a direct result of aileron application. While producing more lift to bank the airplane into a turn, the downwardly-deflected aileron also produces more drag, which acts initially to cause the airplane's nose to turn in the direction opposite to the intended turn. That is, when one wing is lifted relative to the other wing by operation of a conventional aileron to bank the airplane into a turn, it is also pulled back away from the turn relative to the wing on the other side, causing the nose initially to turn, or yaw, in the direction opposite to the turn. This effect becomes increasingly detrimental as the roll rate increases and/or airspeed decreases.

In addition to resulting in inefficient flight, adverse yaw produced by the conventional aileron often contributes to spin entry. When spinning, an airplane is descending and turning in a tight spiral flight path. In a left hand spin, for example, the left wing is down and toward the center of the spiral. Instinctively, many pilots are tempted to initiate right stick or control yoke movement to roll towards the right and out of the spin. With conventional ailerons this action deploys the left aileron down and the right aileron up. The left aileron creates more drag and the spin will be further aggravated.

Another disadvantage of conventional ailerons is that they also require commitment of a sizable portion of the trailing edge of the wing that could otherwise be used for beneficial high-lift devices such as flaps that would otherwise allow lower approach, landing and takeoff speeds—especially advantageous for heavy, high-speed commercial and high-performance military aircraft. Because conventional ailerons and conventional flaps are considered as having separate functions, different regions of the trailing edge of a wing are separately used for either aileron or flap placement.

In view of the draw-backs of conventional aileron and flap configurations, an improved aircraft aileron system has been developed. The improved aileron system is described in U.S. Pat. No. 6,079,672 to Lam, et al. and U.S. Pat. No. 6,554,229 to Lam, et al. and includes two independent panels located at the rear portion of the wing as described in the referenced U.S. Patents. The panels are located in a span-wise direction and aligned with the wing's trailing edge. The panels are independently hinged at their leading edges and are configured to rotate to create angular deflections with respect to the wing. The upper panel (the "aileron panel") may be restricted to upward deflection only from its neutral position and in operation is deployed independently as an aileron. The lower panel (the "flap panel") is capable of both upward and downward deflections from its neutral position, and is deployed independently downward as an auxiliary flap. Both panels are deployed together upwardly only as an aileron. Alternatively, the lower auxiliary flap panel is capable of downward deployment only, to provide a simpler aileron system. For roll control of an aircraft during cruise, one or both of the ailerons panels on one side only are deflected upwards while the aileron panels on the other side remains in its neutral position, as described in the U.S. Patent.

Although there exists shuttle and track systems for extending conventional flap structures, the systems serve a fixed flap that cannot be upwardly deflected to act as a functional component in a dual-panel aileron system. Because conventional flaps cannot be so articulated, conventional flaps are generally fixed solidly to the shuttle to restrict the movement of the flaps to that which is allowed by the track. As such, the flaps can only be extended or retracted along the track—no other articulation is possible. Accordingly, there exists a need for a flap panel shuttle for use in dual-panel aileron systems, wherein the lower panel of the dual-panel aileron system may be configured to operate as a flap and the shuttle is configured to either extend the flap panel along a track system, or allow the flap panel to be articulated upwards with an aileron panel.

SUMMARY OF THE INVENTION

Various implementations of the present invention, and combinations thereof, are related to shuttle systems and, more particularly, to a locking shuttle system for an airplane flap panel.

In one implementation, the present invention is an aircraft, comprising a shuttle movable between a first configuration and a second configuration. The aircraft includes a flap panel attached to the shuttle. The flap panel can move with respect to the shuttle when the shuttle is disposed in the first configuration, and the flap panel cannot move with respect to the shuttle when the shuttle is disposed in the second configuration.

In another implementation, the present invention is a shuttle for use with an aircraft wing. The shuttle includes a body, and a roller connected to the body. The roller is configured to slide along a length of a flap track. The shuttle includes a locking arm connected to the body of the shuttle. The locking arm is configured to selectively engage a flap panel. When the locking arm is engaged to the flap panel, the flap panel cannot move with respect to the shuttle, and when the locking arm is not engaged to the flap panel, the flap panel is not prevented from moving with respect to the shuttle.

In another implementation, the present invention is an aircraft control system. The system includes a wing including a flap track, and a shuttle connected to the flap track and configured to slide along a length of the flap track. The system includes a flap panel pivotally attached to the shuttle at a flap pivot. The flap panel is configured to rotate about the flap pivot. When the shuttle is deployed along a length of the flap track, the shuttle is configured to prevent rotation of the flap panel about the flap pivot, and when the shuttle is withdrawn into a stowed position, the shuttle is configured to allow the flap panel to rotate about the flap pivot.

BRIEF DESCRIPTION OF THE DRAWINGS

Implementations will become more apparent from the detailed description set forth below when taken in conjunction with the drawings, in which like elements bear like reference numerals.

DETAILED DESCRIPTION

The present invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth.

Figure 1A:
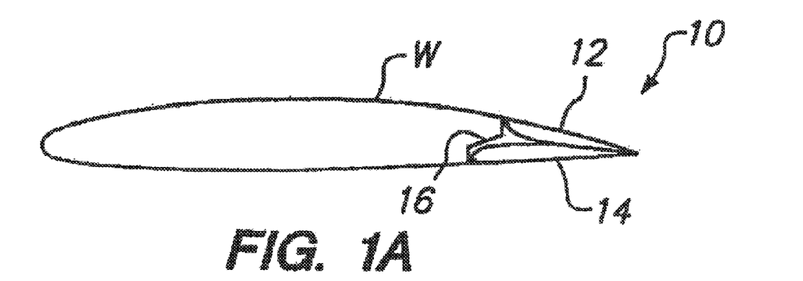
FIGS. 1A, 1B and 1C are illustrations of a cross section, or an airfoil section, of a wing W incorporating a dual-panel aileron system, illustrating different stages in the deployment of the dual-panel system.
Figure 1B:
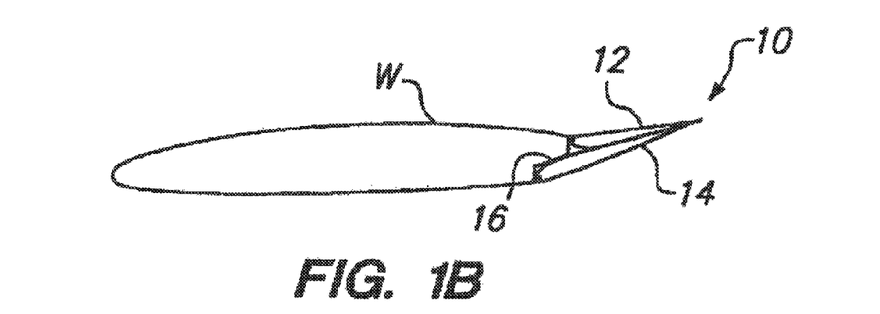
Figure 1C:
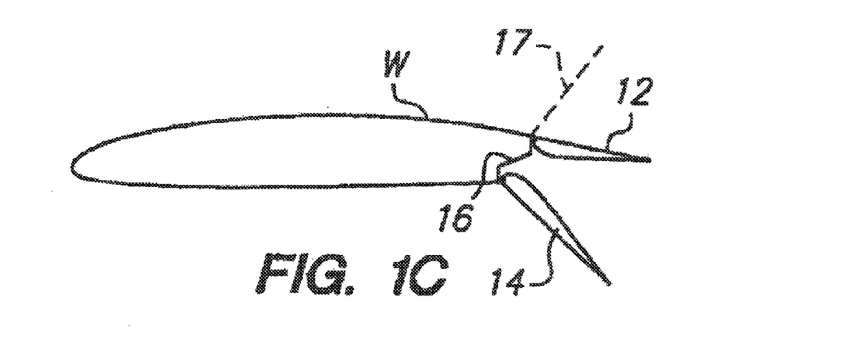

FIGS. 1A, 1B and 1C each show a cross section, or an airfoil section, of a wing W incorporating a dual-panel aileron system 10, illustrating different stages in the deployment of the dual-panel system. The aileron system 10 is shown to include an upper aileron panel 12 and flap panel 14 stowed underneath the aileron panel. Both aileron panel 12 and flap panel 14 are separately hinged to the wing's rear spar 16 or other hard points attached to wing W, and can be operated independently, but can also be made to operate in unison for certain functions when they are engaged. In FIG. 1A, both panels are shown in their respective neutral or retracted positions, in which the panels form smooth continuations of the respective upper and lower surfaces of the wing W. With the aileron panel 12 deflected upwardly, as shown in FIG. 1B, the auxiliary flap panel 14 is also made to deflect upwardly to form an aerodynamically efficient "aileron" in the usual sense. In the present system, however, with the auxiliary flap panel 14 deployed downwardly, as shown in FIG. 1C, the aileron panel 12 can remain in the neutral position (shown in solid lines) or be deflected up only, as indicated by the broken line 17. Accordingly, the dual-panel aileron system, as shown in FIG. 1C, can use both available panels to provide the increased lift functionality of conventional flaps in addition to aileron control.

Figure 2:
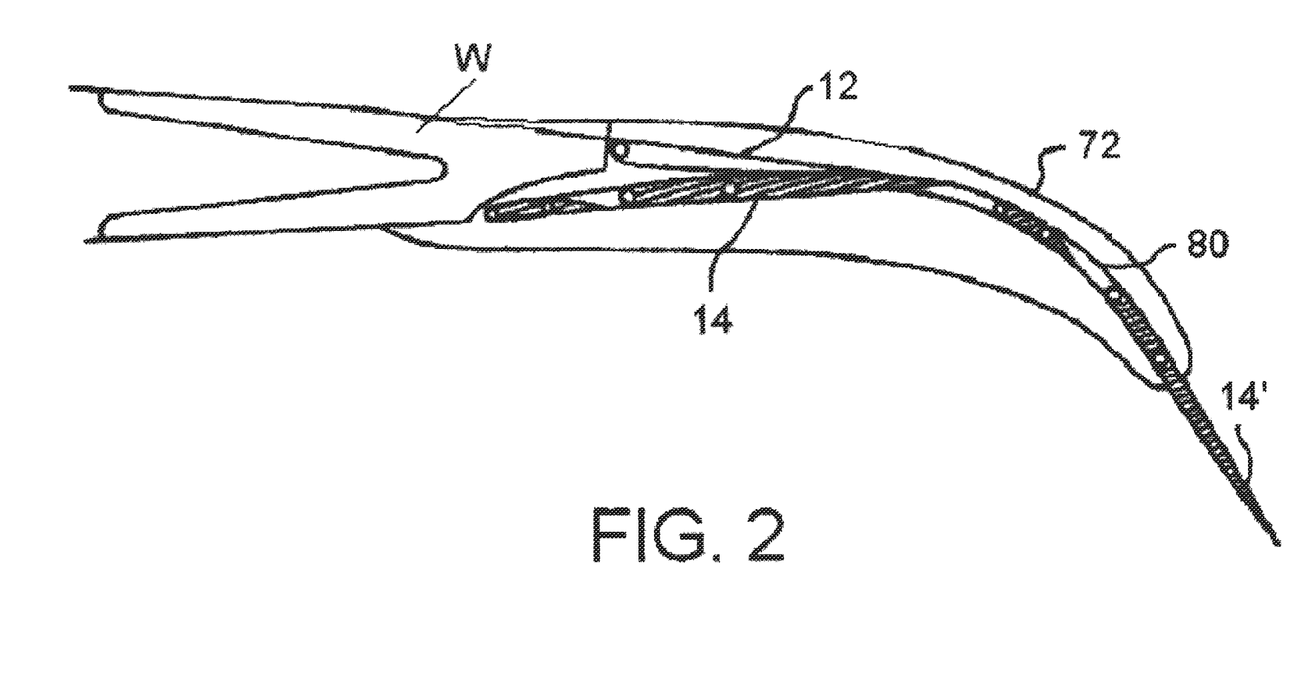
FIG. 2 is an illustration of a dual-panel aileron system incorporating a track for controlling a position and angle of deflection of the flap panel.

In addition to providing the fixed-flap and aileron functionality illustrated in FIGS. 1A, 1B and 1C, the dual-panel system can be used in applications that include flap panels configured to be extended away from the trailing edge of wing W along a rail or track system. For example, FIG. 2 is an illustration of the dual-panel aileron system incorporating a track for controlling a position and angle of deflection of the lower flap panel. As flap panel 14 moves along track 80, track 80 guides the deployment of flap panel 14 away from wing W and also causes the angle of deflection of the flap panel to be modified. To provide environmental protection for the components of the track system, in some applications, track 80 is disposed within a fairing 72 located on wing W, at the ends of the flaps.

Generally, flap panel 14 is mounted to a shuttle that moves along track 80 carrying flap panel 14. As the shuttle moves along the curved portion of the track, both the shuttle and flap panel 14 rotate with respect to wing W causing the angle of deflection of flap panel 14 with respect to wing W to change.

In FIG. 2, the flap panel is shown in a first stowed position as flap panel 14. The flap panel is also shown in an extended position, having been moved along track 80 by the shuttle to a second position and is shown as flap panel 14'. The shuttle may be moved by electrically-driven screw jacks, a mechanical pushrod, cables, or other mechanisms for pushing and/or pulling the shuttle along a length of track 80. Note that in FIG. 2, the dual panel aileron system includes aileron panel 12.

In conventional applications, flaps are fixed to the shuttle. As a result, the flap panel can only be extended or withdrawn along the track—no other articulation of the flap panel is possible. Accordingly, to modify the angle of deflection of the flap panel, the shuttle must be pushed or pulled along the curved portion of the track. The present shuttle system, however, allows for the flap panel to be articulated upwards along with the aileron panel as shown in FIG. 1B. Alternatively, the shuttle may be locked to the flap panel, allowing the flap panel to be moved along a track causing the flap to be extended away from the wing to a desired deflection position. The present shuttle includes one or more safety interlocks to ensure that the flap panel does not deflect upwards while the flap panel is moved along a portion of the track. When the flap panel is fully stowed, however, the interlocks are released and the flap panel is unlocked allowing the flap panel to be rotated upwards as in the deployment illustrated in FIG. 1. When the flap panel is released, the shuttle is fixed to the wing, preventing deployment of the shuttle along the track system.

Figure 3A:
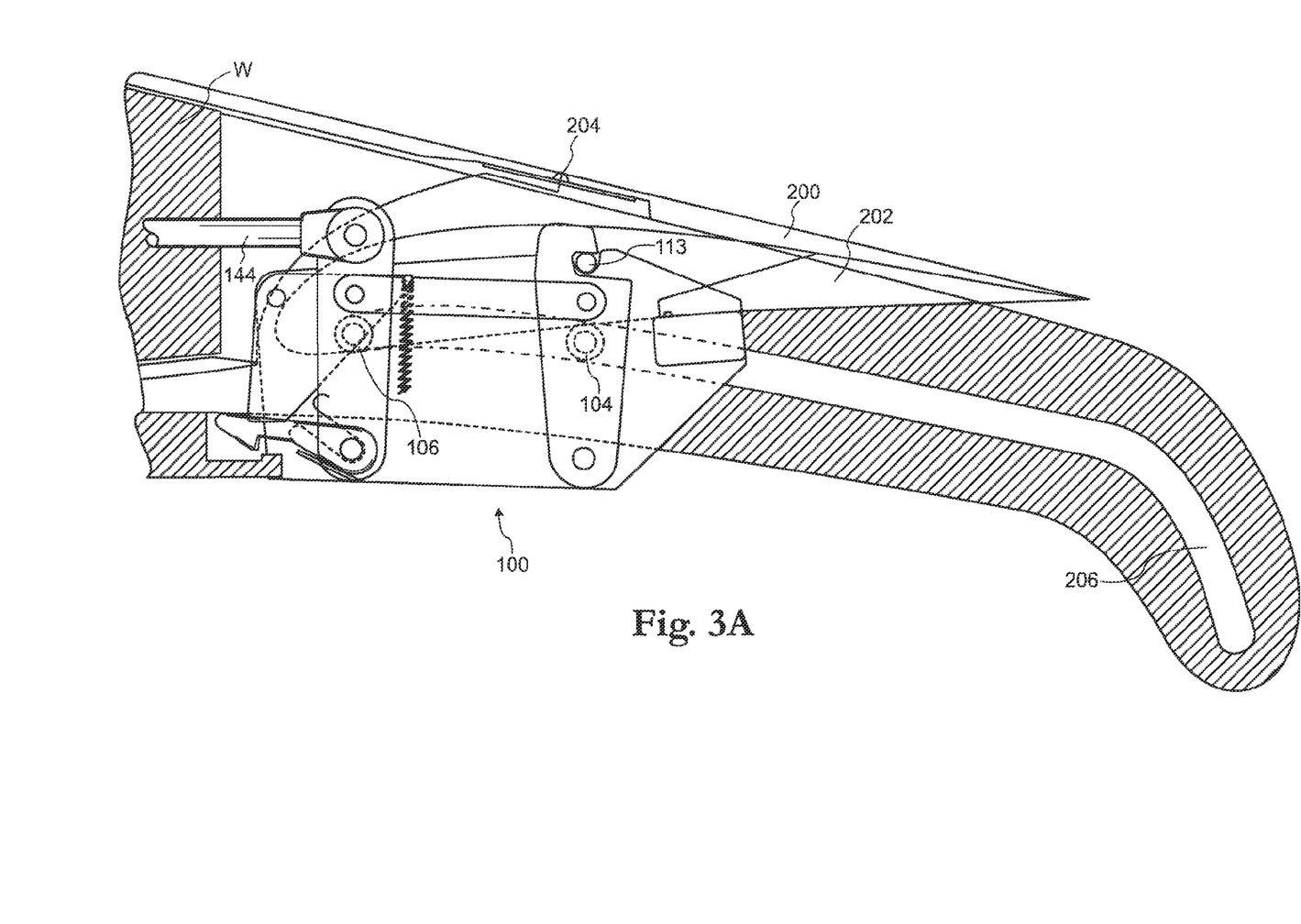
FIG. 3A is a cross-section of a dual-panel aileron system including a shuttle enabling operation of the flap panel within the dual-panel aileron system.

FIG. 3A is a cross-section of a dual-panel aileron system including the present shuttle enabling operation of the flap panel in a dual-panel aileron system. The shuttle is configured to either lock the flap panel for extension of the flap panel along a track system, or unlock the flap panel for operation in conjunction with an aileron panel. A safety interlock is incorporated into the shuttle to prevent inappropriate deployment of the flap panel. FIG. 3A illustrates shuttle 100 in a locked position as the shuttle begins to move along track 206 causing flap panel 202 to be extended away from wing W. Referring to FIG. 3A, aileron panel 200 and flap panel 202 are each mounted to wing W. Aileron panel 200 is configured to rotate about pivot 204, while flap panel 202 is configured to rotate about a pivot point located coaxially with roller 106 and fixed to shuttle 100. In that configuration the pivot point for flap panel 202 is connected to and moves with shuttle 100. In FIG. 3A, both aileron panel 200 and flap panel 202 are shown in their respective neutral positions.

Shuttle 100 is mounted to track system 206 of wing W. When flap panel 202 is locked to shuttle 100, shuttle 100 can move along track 206 to deploy flap panel 202 along a length of track 206. The position and movement of shuttle 100 along track 206 is controlled using control push rod 144 that is connected to shuttle 100. When flap panel 202 is locked to shuttle 100, push rod 144 pushes shuttle 100 along track 206 causing shuttle 100 to move along track 206 and flap panel 202 to be deployed as a flap.

To stow flap panel 202 in the flap panel's neutral position, push rod 144 pulls shuttle 100 along track 206 towards wing W. Upon being fully stowed, flap panel 202 is unlocked from shuttle 100 and shuttle 100 is latched to wing W. After shuttle 100 unlocks flap panel 202, flap panel 202 can rotate upwards about its pivot point to move with aileron panel 200 in a dual panel configuration as illustrated in FIG. 1B.

Figure 3B:
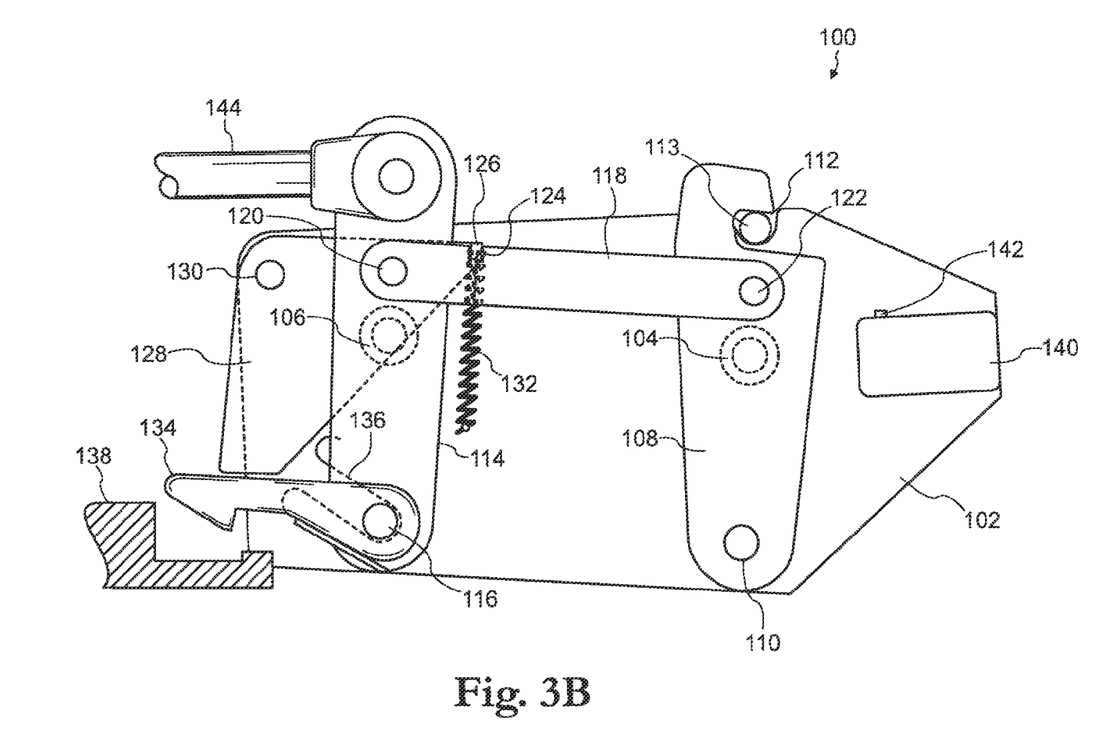
FIG. 3B is an illustration showing additional detail of the shuttle shown in FIG. 3A, with the shuttle being illustrated in a locked configuration providing flap extension independent of upper aileron panel deflection for roll control.

FIG. 3B is an illustration showing additional detail of shuttle 100 of FIG. 3A, with shuttle 100 in a locked configuration. Shuttle 100 includes back plate 102. Back plate 102 may be constructed from a material such as aircraft-grade aluminum, carbon fiber, steel, or other metals or materials that are strong enough to provide an adequate body for supporting a mounted flap both in the stowed and deployed positions during flight and when rotated upwards as shown in FIG. 1B. Back plate 102 also provides support for the components of shuttle 100.

Shuttle 100 includes wheels or rollers 104 and 106 mounted to back plate 102. Rollers 104 and 106 are sized to connect to and slide along a track system of an aircraft wing (see, for example track 206 of FIG. 3A). In some implementations, rollers 104 and 106 are replaced by other structures or mechanical features configured to move along a track system for deployment of the flap panels.

Shuttle 100 includes a locking mechanism for fixing shuttle 100 to flap panel 202. In the implementation shown in FIG. 3B, the locking mechanism includes hook arm 108, however other locking mechanisms may be incorporated into shuttle 100. Hook arm 108 is mounted to back plate 102 at pivot 110. Pivot 110 allows hook arm 108 to rotate about pivot 110. At the end of hook arm 108, opposite pivot 110, hook arm 108 includes hook 112. When hook arm 108 is rotated clockwise (as illustrated in FIG. 3B), hook 112 of hook arm 108 is configured to couple to rod 113 that is fixed to a lower potion of flap panel 202 (see FIG. 3A) to lock flap panel 202 to shuttle 100 and to prevent a rotation of flap panel 202 upwards. Alternative locking mechanisms may include gearing, locking ratchets, locking pins, or other mechanisms connected to the pivot of flap panel 202 to prevent rotation of flap panel 202. In some cases, flap panel 202 is connected to an electric motor or servo to control a position and/or a rotation of flap panel 202. In that case, the electric motor, hydraulic system, or servo may fix flap panel 202 to shuttle 100 during extension of flap panel 202 along the track system.

Arm 114 is mounted to back plate 102 at pivot 116. Pivot 116 allows arm 114 to rotate about pivot 116. A push rod or other control device 144 may be coupled to arm 114 and can be used to push and pull shuttle 100 along the track system.

Brace 118 is connected to both hook arm 108 and arm 114 at pivots 120 and 122, respectively. Pivots 120 and 122 allow brace 118 to rotate with respect to arm 114 and hook arm 108. With brace 118 coupled to arm 114 and hook arm 108, if a force is applied to arm 114 causing arm 114 to rotate, brace 118 also causes hook arm 108 to rotate in the same direction. In the illustrated configuration including brace 118, arm 114 can be used to control a position of hook arm 108. As shown in FIG. 3B, both arm 114 and hook arm 108 have approximately the same length, however in some applications, arm 114 and hook arm 108 may have different lengths depending upon the geometry of the flap structure of the aircraft. In some implementations, both arm 114 and hook arm 108 are combined into a single solid structure that rotates about a single pivot point or that slides along its own track system. Brace 118 includes notch 124 (see FIG. 6B for an alternative view of notch 124). Notch 124 is sized to receive detent 126 of bell crank 128.

Generally, arm 114, in combination with brace 118 and hook arm 108 allow for a single mount point for a control input (e.g., push rod 144) to control both a position of shuttle 100 (by pushing and/or pulling shuttle 100 along a track system) and also control a locked status of shuttle 100. For example, when extending shuttle 100 along the track by pushing the shuttle with push rod 144, the force applied by push rod 144 also causes the locking mechanism incorporated into shuttle 100 to be activated. Conversely, the act of pulling shuttle 100 along the track (e.g., into a neutral position) causes the locking mechanism to be unlocked when shuttle 100 is in a fully stowed position. In addition, an interlock mechanism may be incorporated into shuttle 100 to prevent the locking mechanism of shuttle 100 to transition from the locked to unlocked state or from the unlocked to locked state unless shuttle 100 is in a neutral, or fully stowed position and is connected to wing W.

Referring to FIG. 3B, bell crank 128 is mounted to back plate 102 of shuttle 100 at pivot 130. Bell crank 128 is configured to rotate about pivot 130. Detent 126 is mounted at a first arm of bell crank 128. As force is applied to the second arm of bell crank 128, detent 126 may be raised or lowered as bell crank 128 rotates about pivot 130. Spring 132 is mounted from the first arm of bell crank 128 to back plate 102 causing detent 126 of bell crank 128 to be biased in a downwards direction against brace 118. Alternatively, spring 132 may be replaced by other mechanical or electronic control systems components causing detent 126 to be biased against brace 118. For example, additional springs may be mounted to shuttle 100 and bell crank 128 to apply a force to the second arm of bell crank 128. Alternatively, electric motors or servos may be used to control a position of bell crank 128.

When brace 118 is moved so that notch 124 is positioned under detent 126, spring 132 causes detent 126 to move downwards into notch 124 to act as the interlock to control a locking and unlocking of shuttle 100. When detent 126 is positioned within notch 124, lateral movement of brace 118 is prevented with respect to back plate 102 of shuttle 100 and neither arm 114 nor hook arm 108 are able to rotate with respect to back plate 102 of shuttle 100. This position may be referred to as a locked position for shuttle 100. As shown in FIGS. 3A and 3B, when in the locked position, the hook portion of hook arm 108 is positioned around the locking rod 113 of the flap panel thereby preventing the flap panel from being raised upwardly away from shuttle 100. Conversely, bell crank 128 is rotated counter-clockwise, detent 126 is lifted out of notch 124 unlocking shuttle 100. As such, bell crank 128 operates as an interlock control mechanism to control the locked state of shuttle 100.

Shuttle 100 includes hook or bumper hook 134 mounted to back plate 102 at pivot 116. Hook 134 allows shuttle 100 to be coupled to a bumper 138 of the wing when shuttle 100 is fully stowed. Bumper 138 is connected to wing W and, as such, when hook 134 is coupled to bumper 138, shuttle 100 is fixed to wing W and shuttle 100 cannot move along track 206 (see FIG. 6A, for example). Hook 134 is configured to rotate about pivot 116.

Hook 134 includes spring 136 to bias hook 134 in the position shown in FIG. 3B. Generally, hook 134 and spring 136 are configured so that, when unloaded, hook 134 maintains the same angle to arm 114, regardless of an orientation of arm 114. Accordingly, when arm 114 is rotated clockwise, hook 134 is lifted and when arm 114 is rotated counter-clockwise, hook 134 is lowered. In each position, however, a force may be applied to hook 134 causing spring 136 to temporarily compress allowing hook 134 to be raised above the normal resting place of hook 134. As such, when moving shuttle 100 along the track towards bumper 138, hook 134 is configured to slide over and couple to bumper 138, or another portion of the aircraft structure. In the locked configuration illustrated in FIG. 3B, hook 134 is lifted above bumper 138. As such, shuttle 100 can be pushed along a track causing the locked flap panel to be extended along the track system.

Flap sensor 140 is mounted to back plate 102 of shuttle 100. Flap sensor 140 includes switch 142 and is configured to be triggered when the flap panel is in the flap's neutral position. Switch 142 is positioned so that when the flap panel is in a neutral position, the flap panel contact switch 142 is triggered allowing the neutral flap position to be detected.

To extend flap panel 202 along track 206, flap panel 202 is first locked to shuttle 100 as shown in FIG. 3A. To lock flap panel 202 to shuttle 100, shuttle 100 is withdrawn to its neutral position (with hook 134 locking to bumper 138) by push rod 144, and the flap panel is first placed in a neutral position to contact flap panel contact switch 142. Hook arm 108 is then moved forward by push rod 144 exerting force on arm 114. As arm 114 rotates, hook 134 is lifted, unlocking shuttle 100 from bumper 138 allowing shuttle 100 to move along track 206. Also as arm 114 rotates, the hook of hook arm 108 couples to rod 113 connected to flap panel 202. As hook 112 engages rod 113, notch 124 in brace 118 aligns with detent 126 causing the detent to fall into notch 124 locking a position of brace 118, arm 114, and hook arm 108 and locking hook 112 of hook arm 108 to flap panel 202. At that time, the flap panel is locked to shuttle 100 and hook 134 is released from wing W. As such, the flap may be deployed along track 206 by push rod 144.

Figure 4:
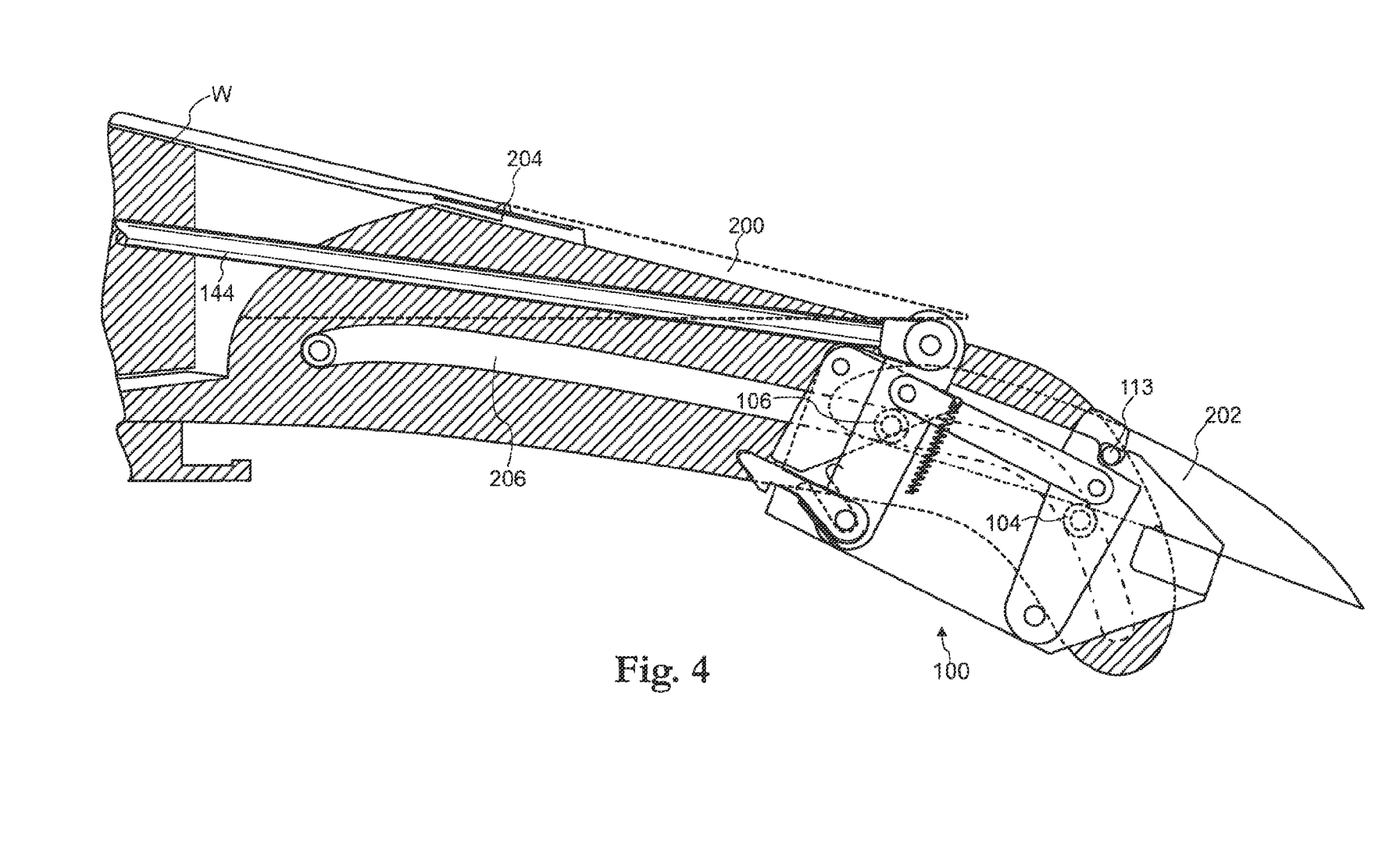
FIG. 4 illustrates a flap panel of a dual-panel aileron system being extended along a track system of a wing, where the flap panel is locked to the shuttle.
Figure 5:
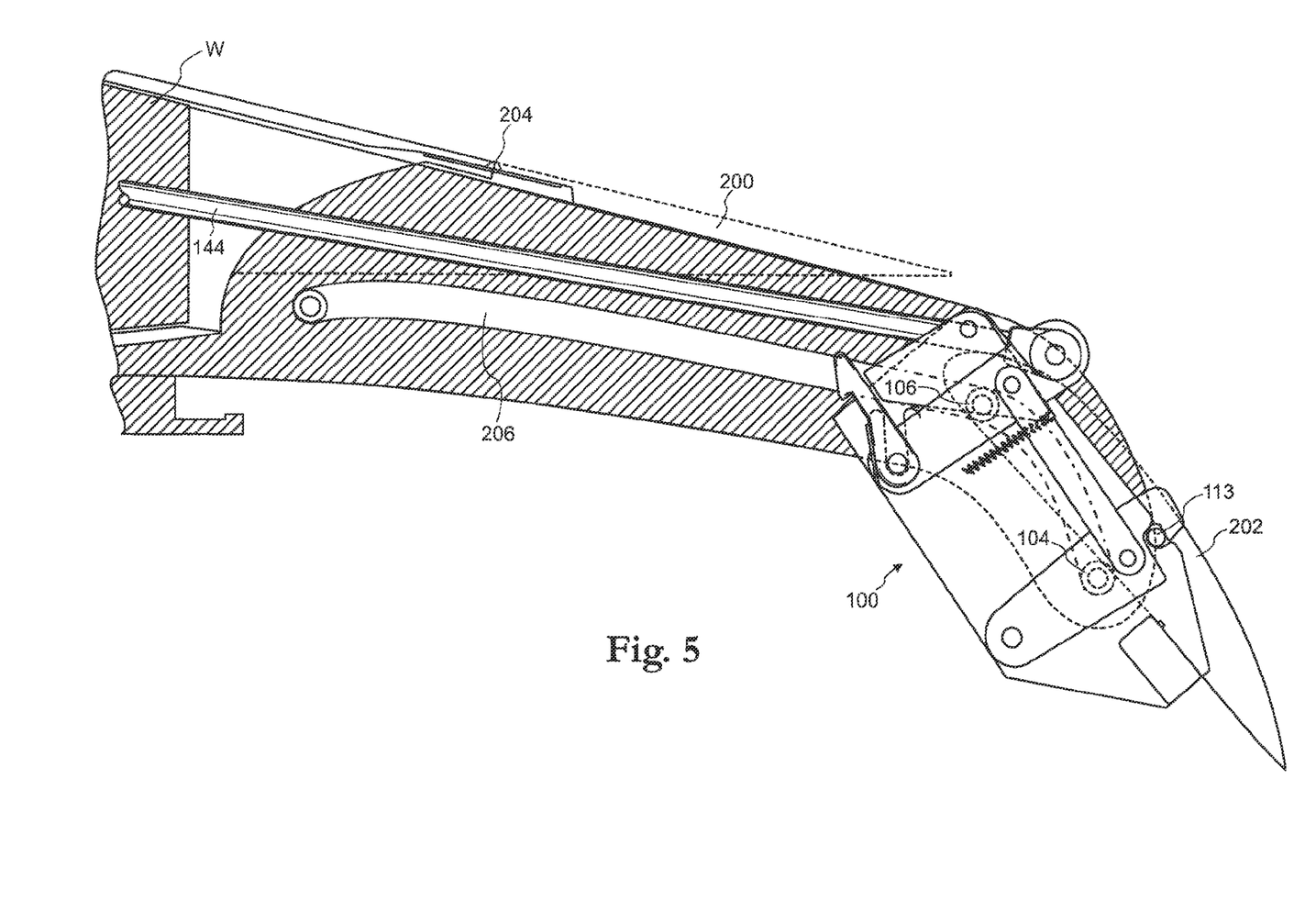
FIG. 5 illustrates a flap panel of a dual-panel aileron system being extended along a track system of a wing, where the flap panel is locked to the shuttle and is providing approximately 50 degrees of flap.

FIG. 4 illustrates flap panel 202 and shuttle 100 being extended along track 206 of wing W, where flap panel 202 is locked to shuttle 100. As shuttle 100 is pushed along track 206 by push rod 144, flap panel 202 is extended away from wing W increasing the surface area of wing W. As shuttle 100 approaches the curved portion of track 206, the angle of deployment of flap panel 202 is also changed, increasing the wing's camber. In FIG. 4, flap panel 202 is deployed to provide approximately 20 degrees of flap deployment. Similarly, FIG. 5 illustrates flap panel 202 being extended along track 206 of wing W, where flap panel 202 is locked to shuttle 100 and is providing approximately 50 degrees of flap.

Figure 6A:
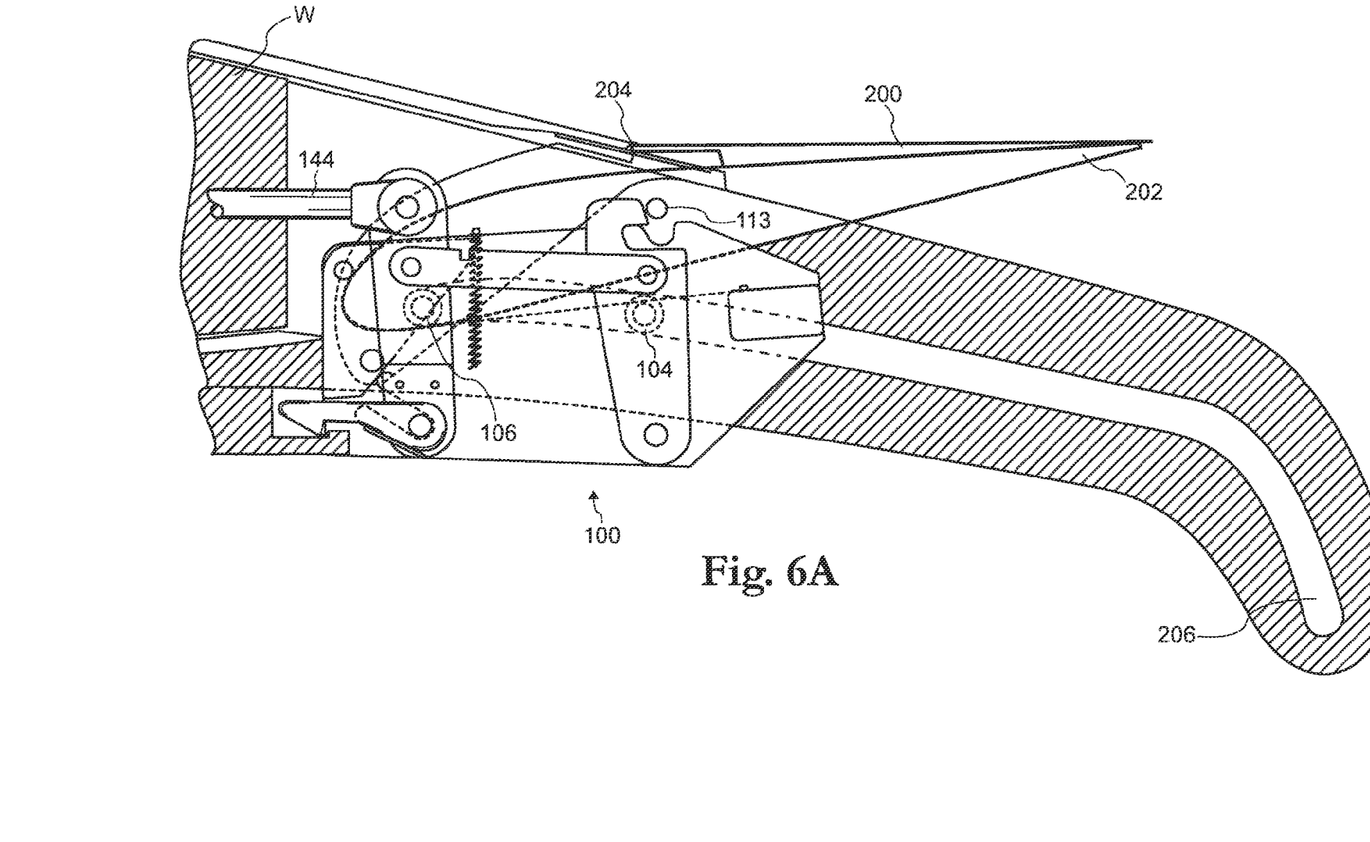
FIG. 6A is a cross-section of a dual-panel aileron system including a shuttle enabling operation of the flap panel within the dual-panel aileron system, where the shuttle is in an unlocked configuration allowing upward deflection of a flap panel.
Figure 6B:
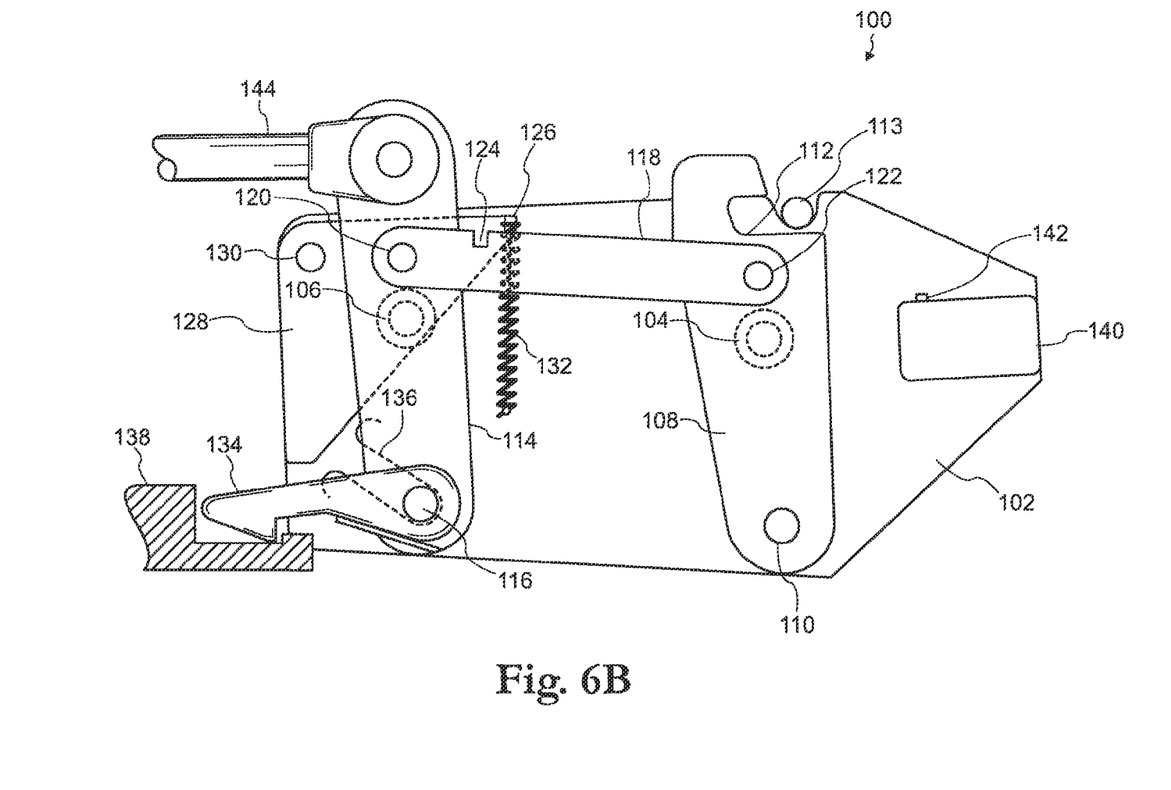
FIG. 6B is an illustration showing additional detail of the shuttle shown in FIG. 6A, with the shuttle being illustrated in an unlocked configuration.

FIG. 6A is an illustration of shuttle 100 in an unlocked configuration. FIG. 6B is an illustration showing additional detail of the shuttle shown in FIG. 6A, with the shuttle being illustrated in an unlocked configuration. When unlocked, flap panel 202 may be rotated upwards. To unlock flap panel 202 so that flap panel 202 may be used in an aileron configuration (see, for example, FIG. 1B), shuttle 100 must first be fully stowed in a neutral position. To stow flap panel 202, push rod 144 pulls shuttle 100 along track 206 into the stowed position, as illustrated in FIG. 6A. As shuttle 100 is pulled along track 206 into the stowed position, a portion of wing W pushes or butts against the second arm of bell crank 128 causing bell crank 128 to rotate counter-clockwise, thereby extending spring 132. As bell crank 128 is rotated, detent 126 is lifted out of notch 124 of brace 118 allowing both arm 114 and hook arm 108 to be rotated counter-clockwise. To complete the stowing process, push rod 144 continues to pull shuttle 100 into the stowed position causing arm 114 and hook arm 108 to rotate counter-clockwise. As arm 114 rotates counter-clockwise, hook 134 is lowered and contacts bumper 138. As shuttle 100 continues to slide towards its fully stowed position, spring 136 is compressed causing hook 134 to move over bumper 138. After passing over bumper 138, spring 136 causes hook 134 to move downwards behind bumper 138 coupling hook 134 and shuttle 100 to bumper 138. After hook 134 is coupled to bumper 138, shuttle 100 is fully stowed and locked into position by hook 134. During this process, because arm 114 and hook arm 108 are rotated counter clockwise, hook 112 is moved away from rod 113 of flap panel 202, releasing flap panel 202. Accordingly, flap panel 202 is released and can be rotated upwards with aileron 200 (see, for example, FIG. 1B) around a pivot point located coaxially with roller 106.

Returning to FIG. 3A, to transition from the unlocked configuration illustrated in FIGS. 6A and 6B to the locked configuration shown in FIGS. 3A and 3B, (such as when transitioning from using the flap panel as an aileron to extending the flap panel along track 206), flap panel 202 is first lowered to the flap panel's neutral position. Upon reaching the neutral position, flap panel 202 contacts switch 142 of flap sensor 140. Upon detecting flap panel 202 contact, flap sensor 140 may instruct the pilot (for example, via a lit cockpit instrument) that flap panel 202 is in a neutral position and may be extended. In other implementations, a flight control computer may receive the signal that the flap panel is in its neutral position and may then initiate flap extension.

To extend flap panel 202, the pilot provides a control input causing push rod 144 to be extended. As push rod 144 is extended, push rod 144 causes arm 114 and hook arm 108 to rotate clockwise causing hook 112 of hook arm 108 to couple to rod 113 of flap panel 202 locking flap panel 202 to shuttle 100. At this time, notch 124 of brace 118 is positioned below detent 126. As arm 114 rotates clockwise, hook 134 is raised above bumper 138 uncoupling shuttle 100 from wing W and allowing shuttle 100 to be pushed along track 206 to extend flap panel 202. As shuttle 100 begins to move along track 206, wing W no longer pushes against the second arm of bell crank 128 allowing spring 132 to pull detent 126 downwards into notch 124, locking hook 112 to rod 113 of flap panel 202. With detent 126 positioned within notch 124, the positions of both arm 114 and hook arm 108 are locked, preventing hook 112 from releasing rod 113. Accordingly, flap panel 202 is locked to shuttle 100. Therefore, shuttle 100 and flap panel 202 may be extended along track 206 without flap panel 202 being able to lift upwardly away from shuttle 100.

Figure 7:
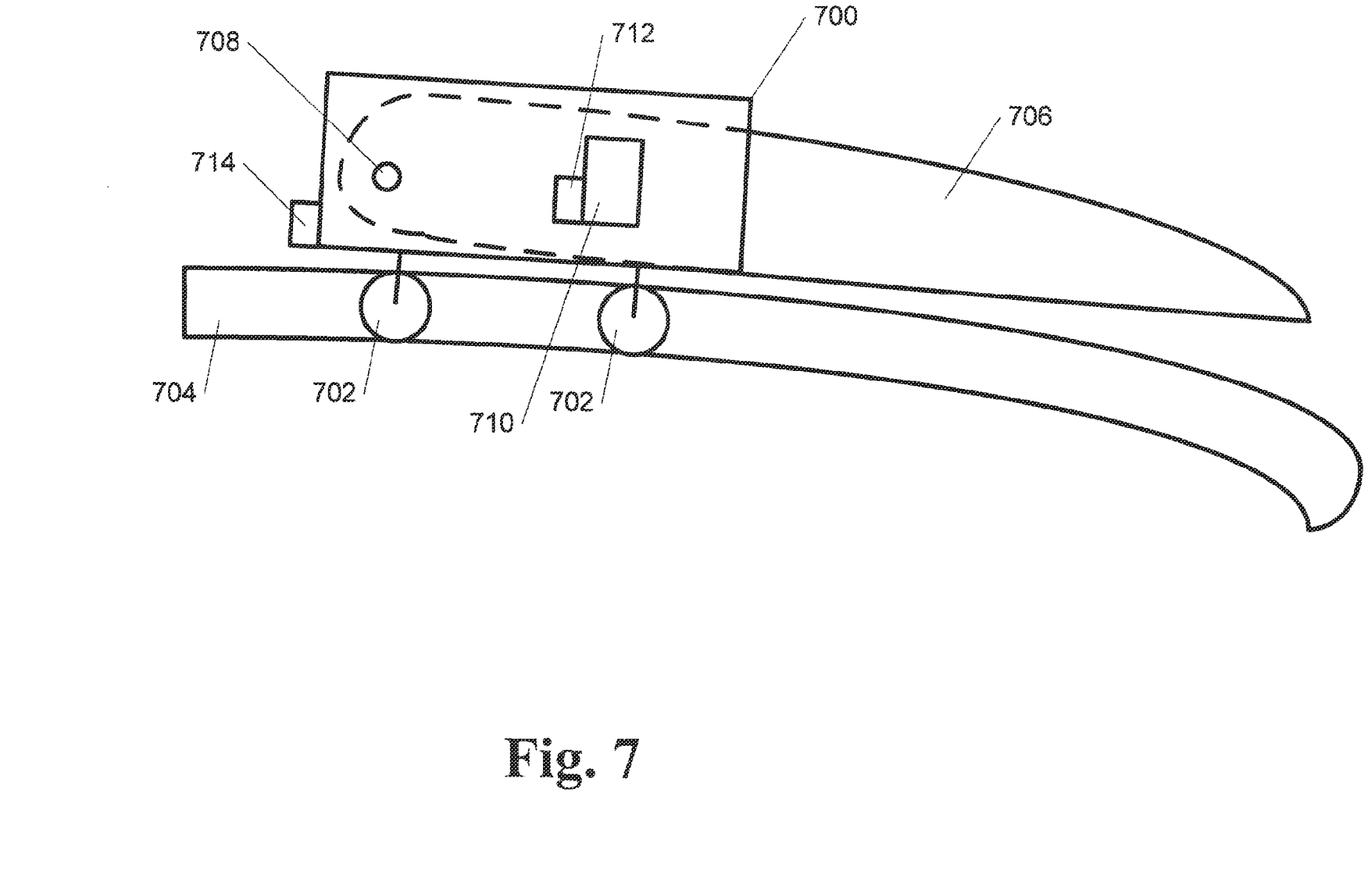
FIG. 7 is an illustration of another implementation of the present flap panel shuttle.

FIG. 7 shows an alternative implementation of the present flap panel shuttle. Shuttle 700 includes mounting mechanism 702 for coupling shuttle 700 to a flap track 704 of an aircraft wing. Mounting mechanism 702 may include rollers, slides, or other guides that allow for shuttle 700 to move along a length of flap track 704 in a controlled manner. In one implementation, shuttle 700 is configured to move between a stowed position, where shuttle 700 is withdrawn along track 704 to a position proximate, or contacting the aircraft wing. Alternatively, shuttle 700 can be extended along track 704 allowing for flap panel 706 to be deployed as in normal flap deployment.

Flap panel 706 is connected to flap shuttle 700 at pivot point 708. Flap panel 706 is configured to rotate about pivot point 708 allowing for flap panel 706 to be rotated upwardly, away from shuttle 700.

Shuttle 700 includes lock 710. Lock 710 is configured to selectively engage flap panel 706 in either a locked or unlocked position. When lock 710 is locked, flap panel 706 is prevented from rotating about pivot 708 and cannot, therefore, move with respect to shuttle 700. Alternatively, when lock 710 is disengaged from flap panel 706, flap panel 706 can be rotated about pivot 708 and so can be lifted, or rotated upwards, away from shuttle 700. Lock 710 can include a mechanical device such as a mechanical locking arm that physically engages a portion of flap panel 706, such as a rod passing therethrough. Alternatively, lock 710 can include electromagnetic devices such as electric motors, or electromagnets, that can be selectively engaged to fix a position of panel 706. Alternatively, lock 710 may be implemented by software code executed by a flight control computer. In that case, lock 710 may comprise computer code causing the flight control computer to disallow upwards deflection of flap panel 706 away from shuttle 700 whenever shuttle 700 is moved away from its stowed position along a length of flap track 704.

Shuttle 700 optionally includes interlock 712. Interlock 712 is configured to lock lock 710 into its locked or engaged position whenever shuttle 700 is deployed along track 704 away from shuttle 700's stowed position. Interlock 712 can include a mechanical device that can be selectively positioned to disable unlocking of lock 710. Alternatively, interlock 712 can include software code that is executed by a flight control system that prevents unlocking of lock 710 whenever shuttle is deployed along a length of track 704. When shuttle 700 is in its stowed position, interlock 712 is disengaged to allow lock 710 to disengage allowing movement of flap panel 706.

Shuttle 700 may also optionally include a bumper lock 714. Bumper lock 714 is configured to fix shuttle 700 to a portion of the aircraft wing when shuttle 700 is withdrawn into its stowed position and flap panel 706 is rotated upwardly away from shuttle 700. Bumper lock 714 can include a mechanical device that can optionally fix shuttle 700 to the aircraft wing. Alternatively, bumper lock 714 can include an electromagnetic device such as an electric motor or electromagnet that can selectively fix shuttle 700 to the aircraft wing. Similarly, bumper lock 714 may be executed in the form of software run by a flight control system that prevent deployment of shuttle 700 along a length of flap track 704 when flap panel 706 is lifted away from shuttle 700, but allows for shuttle 700 to move along flap track 704 when flap panel 706 is seated against shuttle 700.

Figure 8:
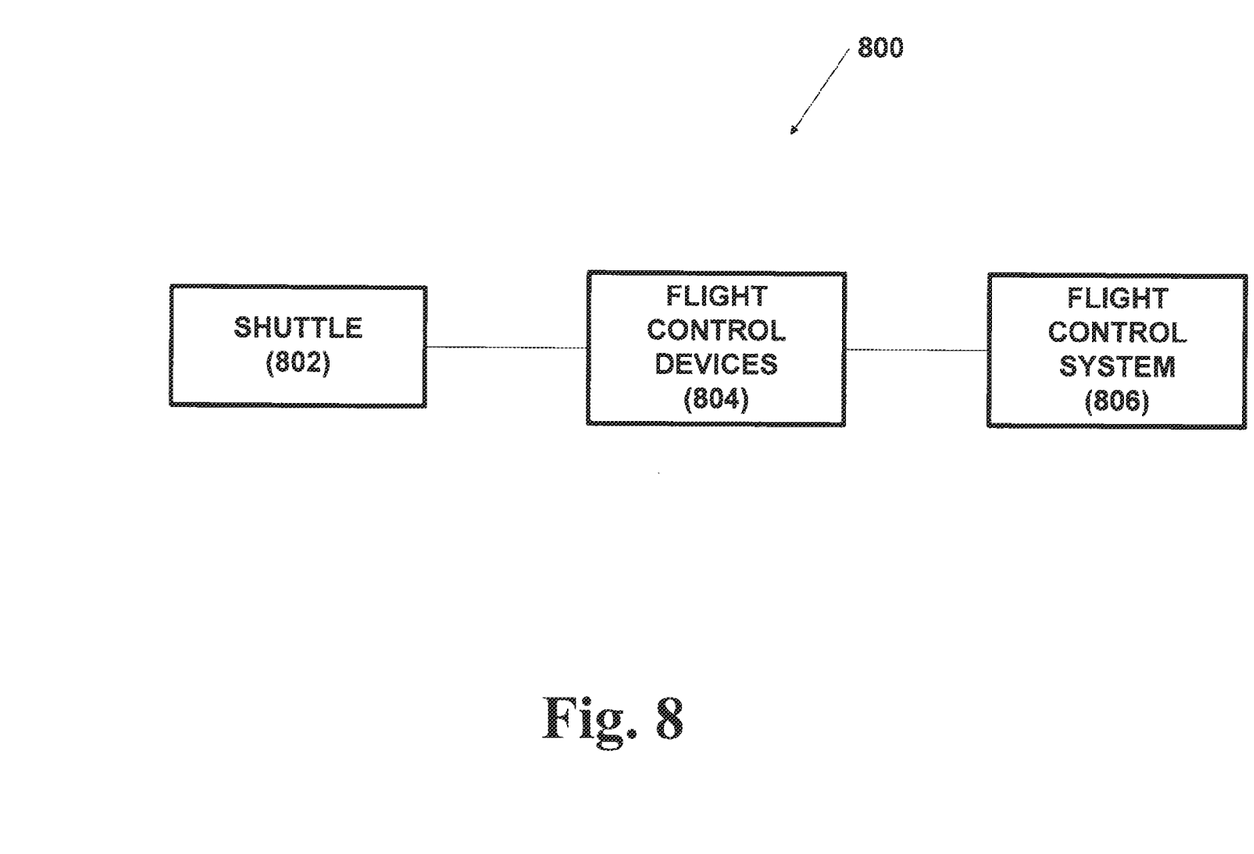
FIG. 8 is an illustration of a flight control system that can be used in conjunction with the present flap shuttle.

FIG. 8 is an illustration of a flight control system that can be used in conjunction with the present flap shuttle. System 800 includes flap shuttle 802. Flap shuttle 802 may be configured in accordance with the present disclosure. Flap shuttle 802 is coupled to a number of flight control devices 804 that can be use to manipulate shuttle 802. Device 804 can include mechanical structures such as push rods, hydraulic systems, or bellcranks that can be used to control a position of shuttle 802 and the various locking systems mounted therein. Device 804 are connected to flight control system 806 that is configured to execute software code that is, in turn, used to manipulate devices 804 for controlling shuttle 802. The software code, as described above, can be used to engage a flap panel locking device for locking a flap panel to shuttle 800. The software code can also be used to engage an interlock system to prevent unlocking of the flap panel when shuttle 802 is deployed along a length of a flap track. The software code can also be used to lock shuttle 802 to a wing structure to prevent shuttle 802 from being moved away from its stowed position when the flap panel is unlocked and the flap panel is rotated upwardly, away from shuttle 802.

The present flap panel shuttle is useful in dual-panel aileron systems to provide a locking shuttle for the flap panel. When the shuttle and the flap panel are to be extended along a track or rail system, the shuttle locks to the flap panel to prevent rotation of the flap panel with respect to the shuttle during deployment along the track system. A safety interlock integrated into the shuttle prevents the locking mechanism from releasing the flap panel during deployment. When the shuttle is withdrawn along the track system and the flap panel is in its stowed position, the shuttle is locked to the aircraft wing preventing movement of the shuttle along the track system and the flap panel is unlocked. The unlocked flap panel may then be rotated upwards to operate in accordance with the dual-panel aileron system described above.

While one or more embodiments of the present invention have been illustrated in detail, the skilled artisan will appreciate that modifications and adaptations to those embodiments may be made without departing from the scope of the present invention as set forth in the following claims.

The invention claimed is:
1. A shuttle for use with an aircraft wing, the shuttle comprising:
  a body;
  a roller connected to the body, the roller being configured to slide along a length of a flap track;

a locking arm connected to the body of the shuttle, the locking arm being configured to selectively engage a flap panel, wherein, when the locking arm is engaged to the flap panel, the flap panel cannot move with respect to the shuttle, and when the locking arm is not engaged to the flap panel, the flap panel is not prevented from moving with respect to the shuttle;

a brace pivotally connected to the locking arm, the brace including a notch;

a bell crank pivotally connected to the body of the shuttle, the bell crank including a detent configured to selectively engage with the notch of the brace, the detent inhibiting movement of the locking arm and the brace with respect to the body of the shuttle when the detent is positioned within the notch of the brace;

a spring connected to the bell crank and the body and being configured to bias the detent of the bell crank against a surface of the brace; and a bumper hook pivotally connected to the body of the shuttle, the bumper hook being configured to selectively engage the aircraft wing when the shuttle is in a stowed position to prevent the shuttle from moving out of the stowed position.

2. The shuttle of claim 1, wherein the spring is configured to bias the bell crank to rotate in a first direction and wherein the bell crank is configured so that when the shuttle moves into the stowed position, the aircraft wing butts against an arm of the bell crank to rotate the bell crank in a second direction.

3. The shuttle of claim 1, including a flap sensor configured to detect a position of the flap panel.

4. The shuttle of claim 1, wherein the bumper hook is configured to disengage from the aircraft wing when the locking arm is engaged to the flap panel.

5. An aircraft control system, comprising:
a wing including a flap track;
a shuttle connected to the flap track and configured to slide along a length of the flap track;
a flap panel pivotally attached to the shuttle at a flap pivot, the flap panel being configured to rotate about the flap pivot, and, when the shuttle is deployed along a length of the flap track, the shuttle is configured to prevent rotation of the flap panel about the flap pivot, and when the shuttle is withdrawn into a stowed position, the shuttle is configured to allow the flap panel to rotate about the flap pivot; and
a bumper hook pivotally connected to the shuttle, the bumper hook being configured to selectively engage the wing when the shuttle is in a stowed position to prevent the shuttle from moving out of the stowed position.

6. The aircraft control system of claim 5, including a locking arm connected to the shuttle, the locking arm being configured to selectively engage the flap panel, wherein, when the locking arm is engaged to the flap panel, the flap panel is prevented from rotating about the flap pivot, and when the locking arm is not engaged to the flap panel, the flap panel is not prevented from rotating upwards away from the shuttle.

7. The aircraft control system of claim 6, including an interlock connected to the shuttle and configured to prevent the locking arm from disengaging from the flap panel while the shuttle is deployed along a length of the flap track.

8. The aircraft control system of claim 7, including an interlock control mechanism, the interlock control mechanism being configured to disengage the interlock when the shuttle is in a stowed position and to engage the interlock when the shuttle is deployed along a length of the flap track.

9. The aircraft control system of claim 5, including a flap sensor connected to the shuttle and configured to detect a position of the flap panel.

* * * * *